United States Patent [19]

Parkinson

[11] Patent Number: 4,913,777
[45] Date of Patent: * Apr. 3, 1990

[54] SOLVENT EVAPORATOR

[76] Inventor: Martin Parkinson, 6 N. Delaware Dr., Nyack, N.Y. 10960

[*] Notice: The portion of the term of this patent subsequent to Dec. 13, 2005 has been disclaimed.

[21] Appl. No.: 278,790

[22] Filed: Dec. 2, 1988

Related U.S. Application Data

[63] Continuation-in-part of Ser. No. 131,649, Dec. 11, 1987, Pat. No. 4,790,911, which is a continuation-in-part of Ser. No. 24,350, Mar. 10, 1987, abandoned.

[51] Int. Cl.$^4$ .......................... B01D 1/22; B01D 3/08
[52] U.S. Cl. ...................... 202/205; 202/236; 202/238; 202/267.1; 159/6.1; 159/7; 159/11.1; 159/11.2; 159/12; 159/DIG. 7; 159/DIG. 15; 203/86; 203/DIG. 2
[58] Field of Search ............... 202/238, 236, 205, 264, 202/267.1; 203/20, 86, 89, 72, 91, DIG. 2; 159/11.2, 11.1, 9.1, 9.2, 7, 6.1, 12, 23, 49, DIG. 7, DIG. 4, DIG. 15

[56] References Cited

U.S. PATENT DOCUMENTS

| | | | |
|---|---|---|---|
| 1,501,515 | 7/1924 | Testrup | 159/12 |
| 2,735,807 | 2/1956 | Banker | 202/238 |
| 2,764,534 | 9/1956 | Nerheim | 159/DIG. 7 |
| 2,843,535 | 7/1958 | Zaugg | 202/238 |
| 3,279,525 | 8/1966 | Takahashi | 159/7 |
| 3,396,088 | 8/1968 | Bechard | 202/238 |
| 3,717,554 | 2/1973 | Ruthrof | 202/238 |
| 4,790,911 | 12/1988 | Parkinson | 159/6.1 |

*Primary Examiner*—Wilbur Bascomb
*Attorney, Agent, or Firm*—Martin Parkinson

[57] ABSTRACT

A rotary evaporator for laboratory scale solvent evaporative procedures is described. A magnetically driven fluorocarbon coated rotor, being open at its base and closed at its top, operating within a container for solvents, creates a thin film for rapid solvent evaporation without the usual requirement for rotating the entire solvent assembly. Rotary seals are eliminated, increased control over bubbling and foaming at higher vacuum is obtained, and continuous solvent addition is simplified.

16 Claims, 3 Drawing Sheets

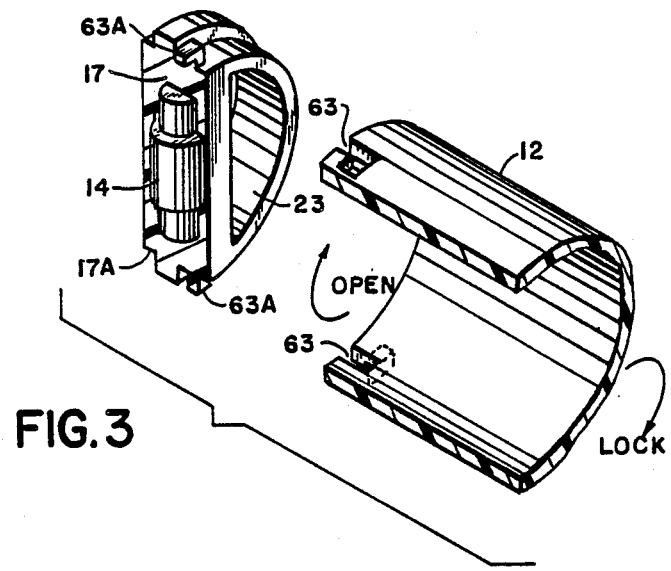
FIG. 3
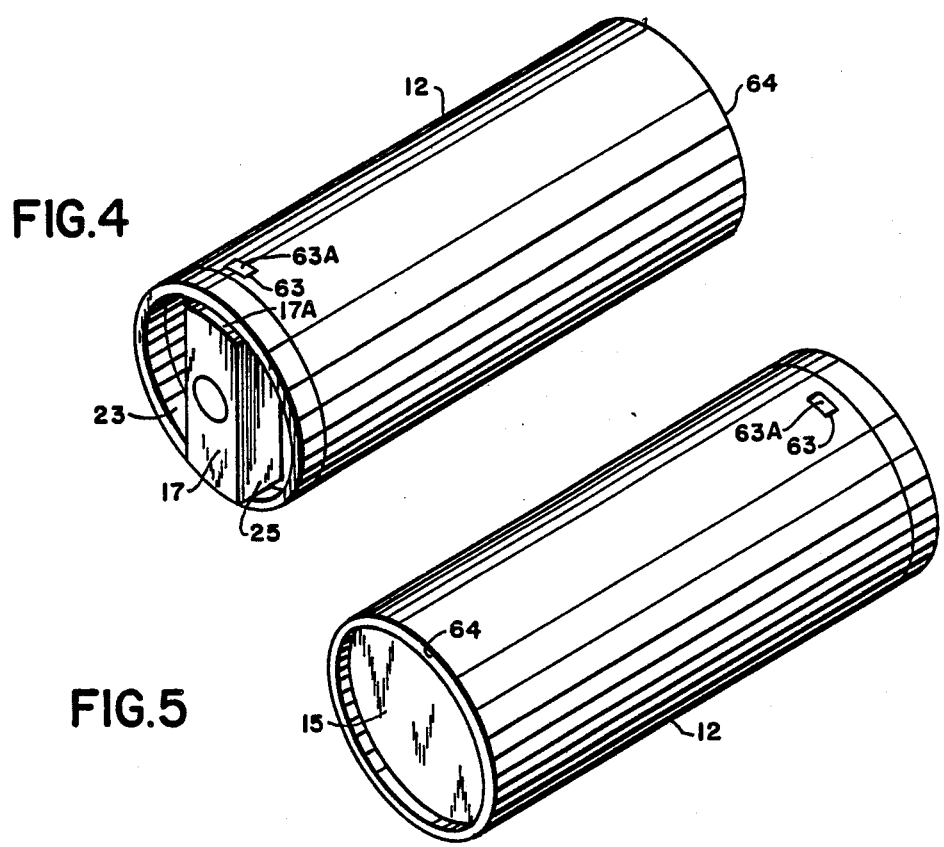
FIG. 4
FIG. 5

SOLVENT EVAPORATOR

BACKGROUND OF THE INVENTION

This application is a continuation in part of copending application Ser. No. 131,649, filed Dec. 11, 1987 (now U.S. Pat. No. 4,790,911), which in turn was a continuation in part of application Ser. No. 024,350, filed Mar. 10, 1987, now abandoned.

This invention relates to solvent evaporators, and more particularly to laboratory scale rotary evaporators.

In current laboratory practice, when it is required to concentrate or remove liquids such as water or organic solvents from a solution or suspension, the liquid is usually placed in a round bottom flask. Means are then provided for rotating this flask in such a manner that a thin film of the solvent is spread over a relatively large area of the inside surface of the flask. A vacuum is applied to the contents of the flask, as, for example, by means of a water aspirator. Under these conditions of simultaneously subjecting the solvent contents of the flask to reduced pressure, centrifugal force, and the creation of a large area of thin film solvent deposition, evaporation proceeds at an accelerated rate. The foaming and bubbling of the solvent which often occurs in a vacuum distillation is either eliminated or substantially suppressed. Both batch and continuous process rotary evaporators of this type are described in U.S. Pat. No. 2,797,747 of July 2, 1957 and U.S. Pat. No. 2,865,445 of Dec. 23, 1958.

While the above mentioned devices have proven to be generally satisfactory, there are problems inherent to their design. The fact that the flask itself must be rotated necessitates a relatively heavy duty and expensive mechanism for accomplishing this task. To rotate this flask rapidly, for example, at speeds of the order of 500 to 600 revolutions per minute which may be required in order to control foaming and bubbling for certain solvents being processed, further necessitates extensive and costly equipment upgrading.

The conventional rotary evaporator design also requires a reliable, vacuum tight rotary seal at the connection between the flask and the means employed to rotate the flask, with the added expense, complexity and potential problems with vacuum leaks inherent in such rotary joints.

A further problem occurs when continuous operation is needed. To introduce solvents to be processed into a rotating flask requires an ingenious, but complicated device as is evident from U.S. Pat. No. 2,865,445.

Again, the fact that standard designs necessitate the flask to be rotated at ambient room temperature limits heat transfer efficiency within the flask, while presenting a potential safety hazard to laboratory personnel.

Accordingly, it is an object of this invention to provide a rotary evaporator that remains stationary during operation, thereby eliminating the necessity for rotary seals, and providing simple operation for either batch or continuous procedures.

Another object is to provide a large surface area for rapid evaporation while at the same time increasing the convenience of product removal and equipment clean-up.

Another object of this invention is to permit high speed rotation of a thin solvent film when required and to do so in a simple and safe manner.

Another object is to increase control over foaming and bubbling during evaporative procedures.

A further object is to permit operation at higher vacuum than is customarily employed.

Finally, it is an object of this invention to improve heat transfer efficiency during rotary evaporator operation.

SUMMARY OF THE INVENTION

In my copending application Ser. No. 131,649, filed Dec. 11, 1987 (now U.S. Pat. No. 4,790,911), I describe a rotary evaporator which achieves these objectives. Said above mentioned invention describes a magnetically driven, cylindrical rotor, being either open or closed at its base, and open at its top, operating within a cylindrical container which holds the solvent(s) to be evaporated. The above mentioned invention describes how a thin film of solvent is deposited onto the surface of the magnetically driven rotor for efficient solvent evaporation, while foaming and bubbling of the evaporating solvent is controlled.

I now have discovered that the rotary evaporator as disclosed in my application Ser. No. 131,649, filed Dec. 11, 1987 (now U.S. Pat. No. 4,790,911) can be improved by having the previously open top of the magnetically driven rotor closed, while the base can be either fully or partially open.

I find that the efficiency and convenience of of current laboratory scale rotary evaporators can be equalled and exceeded by inducing solvent rotation within a stationary container. In the instant invention a cylindrical rotor, being closed at its top, and with a base which has openings, the base of the rotor having at least one magnet affixed to it, is placed within a cylindrical glass container which is open at one end and closed at its other end, after solvent, which is to be evaporated, has been placed within the container. The container is then capped with a vacuum tight closure. The container is provided with means for connecting it to a source of vacuum. The container is now placed in a substantially horizontal position on a hot plate means, with the base of the container being placed in close proximity to at least one externally located magnet, which in turn is connected to a motor capable of rotating this external magnet. When a vapor transport tube is connected to the container, and this tube is connected to source of vacuum, such as a water aspirator, and the motor is energized, the external magnet will cause the magnet within the rotor to turn in synchrony, and a thin film of solvent forms on the rotor, and the solvent begins to evaporate. Heating the contents of the container, as, for example, by placing the flask in a heated water bath, will, of course, greatly accelerate evaporation rates.

A cylindrical shape for the container is preferred for bubble and foam suppression, but alternatively the container may be square or rectangular in shape, and may be made out of materials other than glass. The container must have one relatively large opening for the convenient placement and removal of the rotor, and for access to solvent concentrates or residues. The means for connecting the container to a source of vacuum for the removal of non-condensable and condensable vapors from the container may consist of a hollow cylinder connected to an opening in the wall of the container itself, or in an aperture within the main closure for the container.

The rotor is preferably substantially the length of the container so as to provide a maximum surface area for the evaporation of the thin solvent film. The rotor is substantially cylindrical in shape, with a solid top and a partially or completely open base. The solid top can be threaded onto the main body of the rotor, or slip fitted onto the rotor if desired for ease in cleaning. At least one magnet, or other means capable of being magnetically attracted to the external magnet on the motor, is affixed to the base of the rotor to insure a firm magnetic coupling. The magnet can be permanently attached to the open end of the rotor base. Preferably for simple removal from the rotor to facilitate cleaning, the magnet and its case can be connected to the rotor in a variety of ways, such as a twist lock arrangement to the main portion of the rotor, or by leaf springs for connection to the open end of the base of the rotor, or threaded onto the open base of the rotor, or otherwise conveniently attached for easy removal. Alternatively one or more magnets or means capable of being magnetically secured by the external magnet on the motor can be affixed to the periphery of the base of the rotor to obtain a completely open end for the rotor base to simplify cleaning and residue removal.

Although the usual unevenness of the base of the glass container will usually permit adequate fluid flow both into and out of the rotor, it is preferable to have that portion of the rotor, which forms the magnetic coupling with the external magnet on the motor, to extend a spaced distance beyond the periphery of the base of the rotor in order to permit adequate fluid flow. Or slots may be cut out of the periphery of the rotor base to permit fluid flow. Alternatively holes may be placed along the length of the rotor, which will permit fluid flow but will necessarily complicate cleaning of the rotor.

The instant invention provides efficient solvent evaporation as does my copending application Ser. No. 131,649, filed Dec. 11, 1987 (now U.S. Pat. No. 4,790,911), while at the same time simplifying and foam control. Substantially greater bubble and foam control is achieved in comparison to conventional rotary evaporators since the rotor may be operated at high rotational speeds safely and easily. Troublesome bubbling and foaming which may occur is largely controlled, since the bubbles and foam developing within the rotor must pass out through the rotating base of the rotor, which can be rapidly rotated for additional bubble and foam dispersion. To further control bubble and foam dispersion it is desirable to fabricate the rotor so that its external diameter is just slightly less than the internal diameter of the container, so that bubbling and foaming is further suppressed by the shearing action on the liquid as it passes along the outer surface of the rotor along the path to the vapor outlet tube. Placing the vapor outlet tube at a maximum practical distance away from the base of the rotor further assists bubbling and foam dispersion.

In addition to aiding bubbling and foam control having the rotor diameter close to the internal diameter of the container also permits control over excessive rotor oscillations which may occur at high rotational speeds, causing a loss of magnetic coupling to the external magnet. Alternatively a ring, the outer diameter of which is slightly less than the internal diameter of the container, may be placed on the outer surface of the rotor to control excessive oscillations. Slots may be provided at appropriate intervals within this ring so that vapor transport during solvent evaporation is not inhibited.

A preferred method for controlling excessive rotor oscillations is to have a ring of material, such as, for example, the outer surface of the rotor, extend a small, spaced distance from the solid top of the rotor. This ring of material operates within a circumferential guide within the surface of the container closure which contacts the solvent. With the ring of material at the top of the rotor contacting and being supported by this circumferential guide, safe high speed rotor rotation may be achieved with control of excessive oscillations. This circumferential guide may consist of three or more pegs, or a circumferential groove on the inner surface of the container. This circumferential groove is of additional value in further controlling bubbling and foaming, since bubbles and foam must first pass through the shearing action of the ring at the top of the rotor spinning within the circumferential groove before they can escape from the container via the vapor transport tube, if, for example, the vapor transport tube is connected to an aperture in the main closure for the container.

The main closure for the container required for convenient rotor insertion or removal may be fabricated out of rigid materials together with elastomeric O rings for vacuum retention, or entirely out of suitable elastomers, or a combination of the two. A preferred combination is a rigid inner member fabricated in a polymeric fluorocarbon as, for example, Teflon, together with an elastomeric outer member such as clear urethane.

At the conclusion of an evaporative procedure the large opening in the container permits easy access for removal of the rotor and the container contents. Fabricating the rotor, and at least the inner portion of the container closure out of polymeric fluorocarbon, or out of materials coated with a polymeric fluorocarbon, permits rapid product recovery and equipment cleanup. By having the magnetically attractive materials built into the periphery of the rotor base, or entirely removable from the rotor base, and having said materials coated with or encased in a polymeric fluorocarbon, further expedites sample removal and cleaning. In this manner laboratory scale rotary evaporation is performed simply and conveniently, with increased heat transfer efficiency and greater control over bubbling and foaming at various degrees of process vacuum than was heretofore possible.

BRIEF DESCRIPTION OF THE DRAWINGS

FIG. 3 is a sectional view of the magnetically attractive means at the base of the rotor seen as removable from the rotor.

FIG. 4 is one embodiment of the rotor of the invention, illustrating openings for fluid flow with the magnetically attracting means in place at the base of the rotor.

FIG. 5 is one embodiment of the rotor of the invention, illustrating a circumferential ring extending beyond the solid rotor top.

DESCRIPTION OF THE PREFERRED EMBODIMENT

Figure 1:
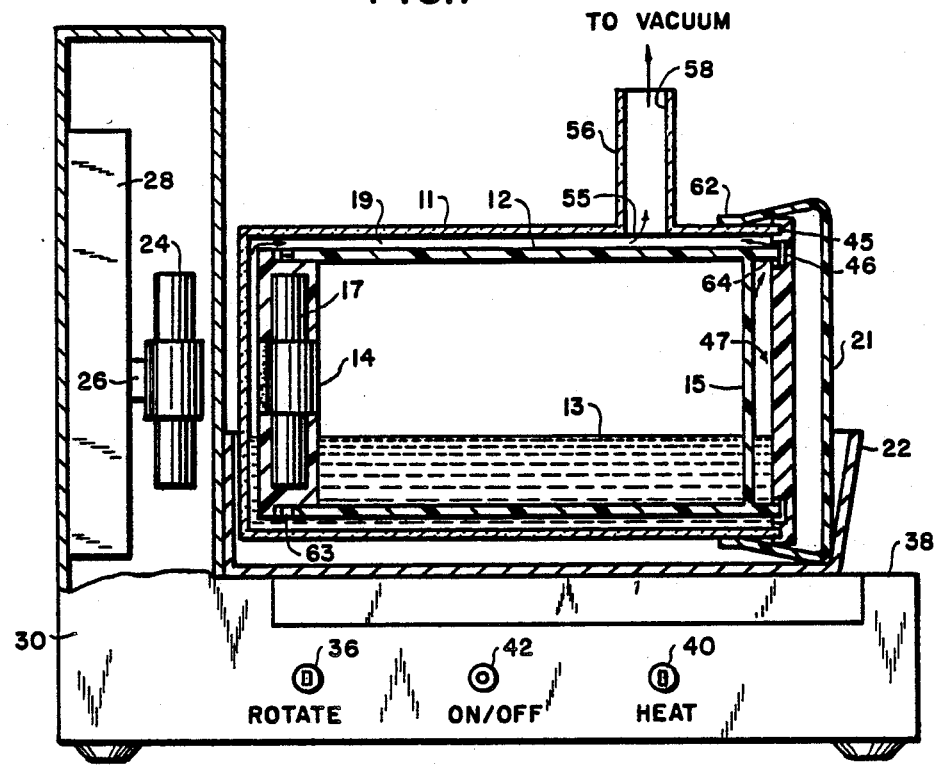
FIG. 1 is a partially sectional view of one possible embodiment of the invention, illustrating a vapor transport tube connected to the side wall of the solvent container.

Referring now to FIG. 1 a rotary evaporator according to the present invention is shown. Container 11, with enclosed rotor 12, together with container closure 21 which is in vacuum tight engagement with the open end of container 11, contained in water bath tray 22, are set in place on hot plate means 38 which forms the top right hand surface of control box 30. One end of the vapor transport tube 56 is in vacuum tight engagement with a source of vacuum (not shown), while the other end of vapor transport tube 56 connects directly to opening 55 in the side wall of container 11. Vapor transport tube 56 may be permanently connected to container 11, as, for example, by fusing one end of the vapor transport tube to the side wall of container 11 if both items are fabricated in glass. Or means for removably connecting said vapor transport tube to said container may be employed, such as using a suitable "O" ring connection. Conduit 58 (FIG. 1) in vapor transport tube 56 provides the exit pathway for both air and solvent vapors in container 11 via opening 55 (FIG. 1) in the side wall of container 11. Located on the front panel of control box 30 are on/off switch 42, rotation control knob 36, and heat control knob 40.

Container 11 is preferably fabricated in clear borosilicate glass. Alternative materials of fabrication can include metal, such as stainless steel, plastics, etc. Container 11 may be square or rectangular in shape, but it is preferably substantially cylindrical along its length, being closed at its base, and with a sufficiently large opening at its top to permit the convenient insertion and removal of rotor 12 (FIGS. 1, 2, 4 and 5). Opening 55 (FIG. 1) within the side wall of container 11, together with vapor transport tube 56 are preferably placed relatively near the open end of the container so as to provide as long a path as is practical for any foam and bubbles forming within rotor 12 to reach opening 55, and hence escape container 11 via conduit 58 in vapor transport tube 56. The closed base of container 11 is substantially flat to facilitate permitting a strong magnetic coupling to develop between magnetic means 14 (FIGS. 1 and 3) in the base of the rotor 12 (FIGS. 1 and 4), and the external magnet 24 (FIG. 1).

Figure 2:
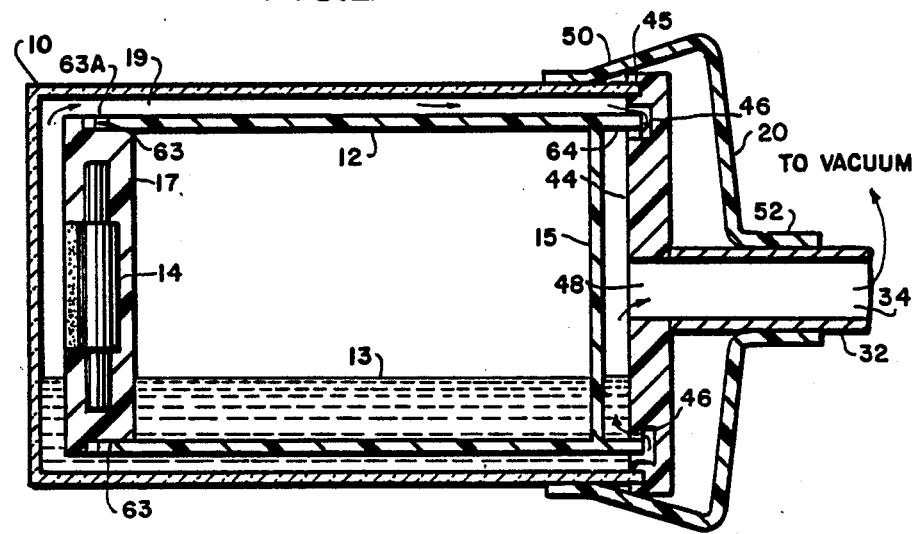
FIG. 2 is a sectional view of one possible embodiment of the solvent container and container closure portion of the invention, illustrating a vapor transport tube connected to the solvent container closure.

The elastomeric container closure 21, together with its skirt portion 62, is preferably fabricated in a clear elastomer, such as a polyurethane elastomer. This rubbery material should have a durometer of between 30 and 50 on the Shore A scale. Container closure liner 47 (FIG. 1) lines the internal surface of container closure 21, and provides a rigid closure for container 11. Liner 47 is preferably made from a polymeric fluorocarbon as will be discussed below for the rotor 12 (FIGS. 1 and 2).

FIG. 1 illustrates the arrangement of rotor 12 within container 11 and closure 21. Rotor 12 is substantially cylindrical along its length, and is closed at its top end wall 15 (FIG. 1), and at least partially open at its base (FIG. 4). Rotor 12 and its top wall may be fabricated from a polymeric fluorocarbon such as polytetrafluoroethylene. However, superior heat transfer is obtained if rotor 12 and its top is fabricated in either thin wall copper or aluminum which is coated with polytetrafluoroethylene. Affixed to the base of rotor 12 is a means for magnetically attracting the rotor base, which is illustrated in FIG. 1 as magnet 14. Since the top wall of rotor 12 is closed in normal operation it is desirable to have the magnetically attracting means at the base of the rotor either located around the periphery of the rotor base, or easily removable for cleaning purposes. FIG. 3 illustrates a simple twist lock arrangement, slots 63 in the rotor base, and matching projections 63A on the magnet case 17 for convenient quick connection and disconnection of the magnetically attracting means for the rotor base. Obviously a variety of other means for removable coupling of said magnetically attracting means can also be employed, such as springs, grooves, threads, etc. The magnetically attracting means such as magnet 14 may be coated with polytetrafluoroethylene, or encased in polytetrafluoroethylene, or encased in a material which in turn is coated with polytetrafluoroethylene. Other suitable polymeric fluorocarbons for fabricating rotor 12 (together with its top wall and magnetically attracting base portion), or for coating a base material to be used in the fabrication of the assembled rotor include: fluorinated ethylene-propylene copolymer; perfluoroalkoxy resin; ethlene-tetrafluoroethylene copolymer; polyvinylidene fluoride; ethylene-chlorotrifluoroethylene copolymer; polyvinyl fluoride. These polymeric fluorocarbons are described in an article entitled "Fluoroplastics", by C. A. Sperati, Modern Plastics Encyclopedia, 1986-1987, McGraw Hill Publishers, the disclosure of is hereby incorporated by reference.

Water bath tray 22 forms part of a conventional hot plate and will not be discussed in detail. Conventional electrical resistance heating elements (not shown) are affixed to the internal surface of hot plate 38, connected by suitable wiring (not shown) to a thermostat (not shown) whose heat settings are controlled by turning heat control knob 40. Water bath tray 22 and hot plate 38 may be fabricated in aluminum. Control box 30 is preferably fabricated from sheet steel.

External magnet 24 (FIG. 1) forms part of a conventional rotary magnetic drive and will not be described in detail. Magnet 24 is connected to and powered by variable speed motor 28 (FIG. 1). Variable speed motor 28 is rigidly connected to the left side panel of control box 30. Suitable wiring connects the motor to a variable transformer not shown) within the control box. Rotation control knob 36 provides the control mechanism for the variable transformer, and is wired (not shown to on/off switch 42, as is heat control knob 40. Magnet 24 is placed in close proximity to the opposite wall of the control box to which the motor is attached, in order to exert a maximum magnetic attraction to rotor magnet 14 when this is in place within container 11, and is set against the outer wall of control box 30.

FIG. 1 also shows the vacuum tight closure arrangement for container 11. Container closure 47 is preferably fabricated in a rigid polymeric fluorocarbon with circumferential groove 45 to secure the edge of the open end of container 11, and circumferential guide 46 which serves as a guide for ring 64 (FIGS. 1 and 5) for both dampening rotor oscillations and providing a vapor pathway out of the container, while at the same time assisting bubble and foam suppression.

With container closure liner 47 in place on container 11 and with magnet 14 and its case 17 secured to rotor 12, and the top ring 64 of rotor 12 in place within circumferential guide 46, container closure 21 is positioned over container closure liner 47, with skirt 62 contacting the outer periphery of container 11. Vapor transport tube 56 (shown permanently connected to container 11 in FIG. 1) is connected to a source of vacuum via, for example, suitable rubber vacuum tubing. During operation, when vacuum is applied to conduit 58 via vapor transport tube 56, elastomeric skirt 62 collapses about the outer periphery of the container, and the external surface of liner 47, forming an unusually reliable vacuum tight seal.

FIG. 1 illustrates an arrangement of the invention in which means for connecting the container to a source of vacuum consists of a vapor transport tube, which in this case is a hollow glass tube, connected to an opening in the wall of the container itself. To operate, solvent 13 is placed within container 11, rotor 12 with its solid top wall 15 (fully assembled with magnetic base 17 secured) is placed within the container and the larger opening in the container (the purpose of which is to provide for convenient insertion and removal of the rotor) is closed with container closure liner 47, and elastomeric container closure 21.

Container 11 is placed within water bath tray 22, which in turn is placed on hot plate means 38, making certain that magnet 14 within case 17 is securely engaged magnetically by external magnet 24. Vapor transport tube 56 is now connected to a source of vacuum, as, for example, by means of rubber vacuum tubing. Turning on switch 42 energizes the apparatus, permitting turning rotation control knob 36 to cause external magnet 24 to rotate, which in turn causes rotor 12 to turn in synchrony. Water may be added as a heat transfer fluid to water bath tray 22, and at this time heat control knob 40 can be activated to supply thermostatically controlled heating to solvent 13. The source of vacuum, as, for example, a water aspirator, is turned on causing air and solvent vapor to be rapidly removed from the container via conduit 58 in tube 56, while at the same time elastomeric container closure 21 collapses about container closure liner 47, and the skirt portion 62 of elastomeric container closure 21 collapses about the outer periphery of the large opening in the container, forming a vacuum seal. Even though the rotor is sealed at its top 15, solvent is free to flow out of the rotor at its base via openings 23 and 25 (FIG. 4). Magnet case 17 can extend a spaced distance from the end of rotor 12, as shown in FIGS. 3 and 4, to further insure adequate fluid flow out of the internal area of rotor 12. The rotor rotating within the container causes a thin film of solvent to be deposited on both the internal and external surfaces of the rotor. Under these conditions of vacuum, controlled heating, and thin solvent film formation, evaporation proceeds efficiently. Since in this arrangement the large opening in container 11 is entirely closed with elastomeric container closure 21, it is permissible to process solvent in excess of 50% of the volumetric capacity of the container. Solvent vapors being generated within the internal surfaces of rotor 12 exit container 11 via openings 23 and 25 at the base of the rotor, said vapor exiting being further assisted by the spaced distance between the base of the rotor and the base of the container caused by projection 17A on magnet case 17. Solvent vapors then pass through annular space 19 between the outer surface of rotor 12 and the inner surface of container 11 via opening 55 to conduit 58 in vapor transport tube 56. Solvent vapors within the space between the outer surface of the top (15) of the rotor and the inner surface of container closure 47 can gain access to annular space 19 via circumferential guide 46 within which ring 64 is rotating, and thereby exit container 11 through said vapor transport tube. Solvent vapors are then either directly pumped out of the system or are subjected to a means for condensing solvent vapors operating in series with a source of vacuum.

The solid top of rotor 12 simplifies troublesome bubbling and foam control problems. Since most of the solvent is contained within the internal area of the rotor, bubbles and foam must pass through the shearing action of the rotating magnet case 17. High rotational speeds of the order of 500 to 600 revolutions per minute may be safely and easily obtained if required for bubble and foam control. In addition, if ring 64 as shown in FIG. 5 is spinning within circumferential groove 46, additional foam and bubble dispersion is achieved. Vapors originating in the space between the solid rotor top and the rigid closure liner must pass around the shearing action of ring 64 spinning rapidly in groove 46. By having the opening to the vapor transport tube placed as far away from the base of the container as is practical further insures additional foam and bubble dispersion by subjecting most exiting vapors to a long path of shearing activity within annular space 19.

FIG. 2 illustrates a container arrangement in which means are provided within a container closure for air and solvent vapor removal. In this case the solvent container 10 has only one opening, the purpose of which is to permit convenient insertion and removal of fully assembled rotor 12. A rigid container closure liner 44 has circumferential groove 45 to fit the edge of the open end of container 10, circumferential guide 46 for rotor ring 64, and also opening 48 providing the air and solvent vapor pathway out of the container during operation. Liner 44, together with rotor 12 (with secured magnet case 17 and solid top 15) are preferably fabricated in a polymeric fluorocarbon, or their materials of fabrication coated with a polymeric fluorocarbon as has been previously described for the apparatus of FIG. 1. Preferably a clear urethane elastomer forms the container closure, fitting over the periphery of the top of container 10, and the outer surface of liner 44. The elastomeric closure 20 has a skirt portion 50 and neck portion 52, said neck portion securing a vapor transport tube 32. This container and closure arrangement is employed in the same manner as described for the apparatus of FIG. 1, except that now all air and solvent vapors pass out of the container via the opening 48 within the container closure. To operate solvent is placed within the container, the fully assembled rotor is placed within the container, the elastomeric closure and rigid liner are secured to the container, and the container is placed in water bath tray 22 on hot plate means 38, so that magnet 14 and 24 are firmly engaged in a magnetic coupling. Vapor transport tube 32 is connected to a source of vacuum. When vacuum is applied skirt 50 collapses about the top of container 10, elastomeric closure 20 collapses onto the outer surface of liner 44, and neck 52 collapses about the outer surface of vapor transport tube 32, forming a reliable vacuum tight seal. Applying controlled rotor rotation and solvent heating as previously described, solvent evaporation proceeds efficiently with the added advantage, for certain applications, of a longer vapor path for most of the solvent vapors to traverse, which is useful for additional bubble and foam control. In the arrangement of FIG. 2, most solvent vapors originate within rotor 12 with its solid top 15, and to gain access to opening 48 and conduit 34 in vapor transport tube 32, vapors must pass through openings 23 and 25 (FIG. 4) while magnet case 17 is rapidly spinning, then traverse the length of annular space 19 from the base of container 10 to its top edge, then said vapors must pass through the additional shearing action of ring 64 spinning within groove 46, before finally exiting the container via opening 48 and conduit 34 in vapor transport tube 32.

Figure 6:
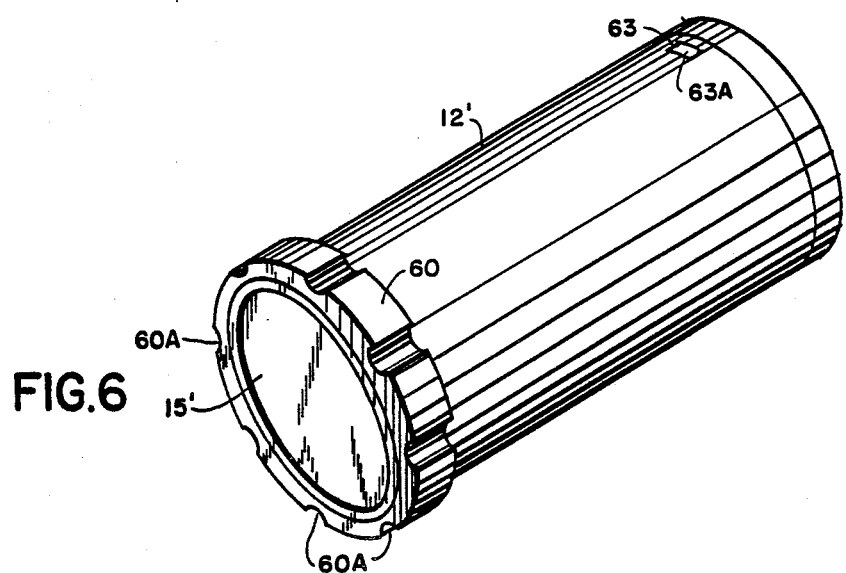
FIG. 6 is one embodiment of the rotor of the invention showing the solid top of the rotor together with a slotted circumferential guide.
Figure 7:
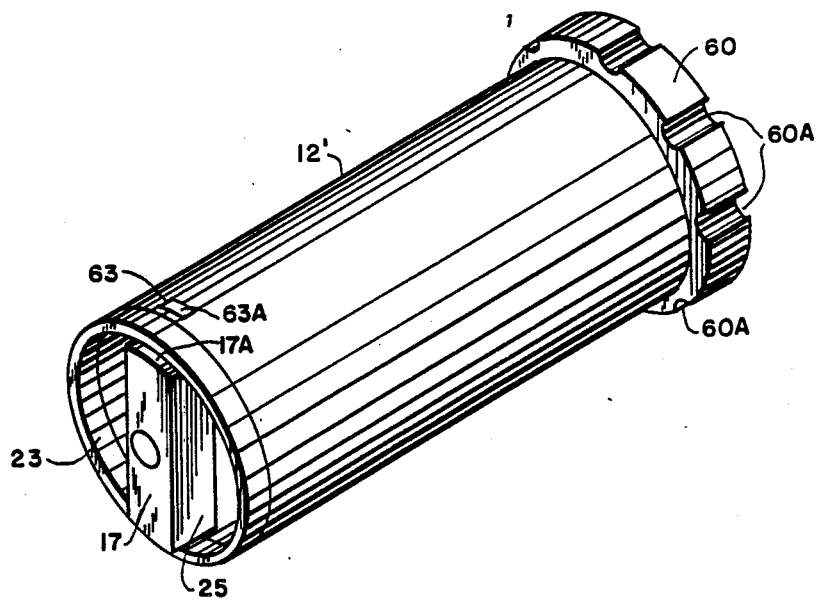
FIG. 7 is one embodiment of the rotor of the invention, showing the magnetically attracting means connected to the base of the rotor together with a slotted circumferential guide.

While the above mentioned examples rely on ring 64 at the top of rotor 12 to provide control over excessive rotor oscillations, said oscillations may be largely controlled by simply having the outer diameter of the rotor slightly smaller than the internal diameter of the container. An alternate method for dampening rotor oscillation is illustrated in FIGS. 6 and 7. In this case rotor 12' is provided with a circumferential guide 60. In order not to interfere with vapor and fluid flow whether rotor 12' is employed as described in FIG. 1 or FIG. 2, slots 60A are provided within circumferential guide 60. FIG. 6 illustrates a solid top 15' for rotor 12'. FIG. 7 illustrates the same magnetic means coupling for the base of rotor 12' as was shown in FIG. 3 for rotor 12.

Since the container always remains stationary during evaporative procedures, a variety of relatively simple methods may be employed to add solvents during operation so that evaporation can proceed on a continuous basis.

While the present invention has been disclosed in connection with the preferred embodiments shown and described in detail, various modifications and improvements thereon will become readily apparent to those skilled in the art. Accordingly, the spirit and scope of the present invention is to be limited only by the following claims.

I claim:

1. An apparatus for evaporating a solvent, which comprises:
   (A) A motor with an attached magnet;
   (B) A hot plate means;
   (C) A container for said solvent;
   (D) Said container having an opening for the placement of a rotor within said container;
   (E) A closure for said opening in said container;
   (F) Means for connecting said container to a source of vacuum;
   (G) Said rotor being cylindrical in shape, having a base and a closed top, said base in said rotor having an opening, said rotor being removably placed within said container;
   (H) Means for magnetically attracting said base of said rotor to said magnet, and being affixed to said base of said rotor; and
   (I) Said container and said rotor being positioned in a substantially horizontal position on the top surface of said hot plate means with the base of said rotor being immediately adjacent said magnet, such that the magnetic field of said magnet securely engages the means for magnetically attracting said base of said rotor to said magnet so that when said motor is energized said magnet is caused to rotate which simultaneously causes said rotor to rotate in synchrony with said magnet, and a thin film of solvent is caused to be deposited onto the inner and outer surfaces of said rotor.

2. An apparatus according to claim 1 wherein said means for magnetically attracting said base of said rotor to said magnet is a second magnet.

3. An apparatus according to claim 1 wherein that part of said container immediately adjacent said magnet is substantially flat.

4. An apparatus according to claim 3 wherein said container is a cylindrically shaped glass flask.

5. An apparatus according to claim 1 wherein said hot plate means further includes means for containing a heat transfer fluid.

6. An apparatus according to claim 1 wherein said rotor is fabricated in a polymeric fluorocarbon.

7. An apparatus according to claim 1 wherein said rotor is coated with a polymeric fluorocarbon.

8. An apparatus according to claim 7 wherein said coating is applied to said rotor fabricated in metal selected from the group consisting of aluminum and copper.

9. An apparatus according to claim 1 wherein said means for magnetically attracting said base of said rotor to said magnet is encased in a polymeric fluorocarbon.

10. An apparatus according to claim 1 wherein said means for magnetically attracting said base of said rotor to said magnet further includes means for removal of said magnetically attracting means from said rotor.

11. An apparatus according to claim 10 wherein said means for attracting said base of said rotor to said magnet is encased in a polymeric fluorocarbon.

12. An apparatus according to claim 1 further comprising means for controlling oscillation of said rotor during said rotation of said rotor.

13. An apparatus according to claim 12 wherein said means for controlling said oscillation of said rotor is a circumferential guide affixed to the outer surface of said rotor.

14. An apparatus according to claim 12 wherein said means for controlling said oscillation is a circumferential guide contained within the surface of said container closure which is exposed to the contents of said container.

15. An apparatus according to claim 1 wherein said closure of said container is fabricated in a polymeric fluorocarbon.

16. An apparatus according to claim 1 wherein said closure for said container is coated with a polymeric fluorocarbon.

* * * * *